CERT OF CORR
ON LAST PAGE

United States Patent Office 3,092,608
Patented June 4, 1963

3,092,608
CURING EPOXIDIZED POLYBUTADIENE WITH A DICARBOXYLIC ANHYDRIDE, AROMATIC VINYLIDENE MONOMER, AND FREE RADICAL POLYMERIZATION INITIATOR
Murray H. Reich, Gene Nowlin, and Charles A. Heiberger, Princeton, N.J., assignors to FMC Corporation, a corporation of Delaware
No Drawing. Filed Jan. 21, 1960, Ser. No. 3,714
11 Claims. (Cl. 260—45.5)

This invention relates to novel thermosetting resin compositions, and to novel products obtained by the reaction of epoxidized diene polymers with new and improved curing systems.

It is well known that various polymeric structures containing epoxy groups, wherein an oxygen atom bridges adjacent carbon atoms, may be cured by reacting these polymers with polyfunctional curing agents, to form cross-linked polymeric products of very high molecular weight. It is also known that polymers and copolymers of butadiene and other dienes may be epoxidized, and the curing of these epoxidized dienes to form high molecular weight products has been the subject of much recent investigation. Each of the various types of curing agents which may be used to cure epoxy-containing resins offers certain advantages and, conversely, each is accompanied by certain disadvantages in particular applications. Of particular interest in the curing of epoxypolybutadienes is their behavior with carboxylic acids and anhydrides, since these curing agents react rapidly and under relatively mild conditions with epoxypolybutadienes. These compositions are described in United States Patent 2,829,135 of Greenspan and Light.

We have now discovered that certain anhydride curing systems for epoxypolybutadienes, when modified with a vinyl benzene derivative and cured in the presence of a free radical initiating agent, produce hard, thermally stable products at an accelerated rate. As the anhydride component, at least 5% of the total anhydride is an unsaturated anhydride having a reactive olefinic double bond; as the vinyl benzene derivative, a compound of the formula

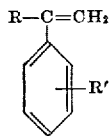

R—C=CH₂ where R and R' may each be hydrogen or the methyl radical; and as the free radical initiating agent, one having a decomposition point in the range of about 75° to 175° C. This curing combination enhances both the cure rate and the cured properties over results obtained in the absence of either the vinyl benzene derivative or the peroxide. Higher degrees of hardness, and higher thermal stabilities, are achieved at lower temperatures and shorter cure times, accompanied by enhanced resistance to the prolonged action of boiling water, and other improved properties.

Further benefits are obtained by inclusion in the curing formulation of an inhibitor for free radical polymerization, such as hydroquinone. This additive not only prolongs the pot life of the curing system, but also enhances the properties of the cured products, in that the seemingly antagonistic combination of free radical initiator and inhibitor provides lighter, clearer products than are obtained in their absence.

There is an added advantage to the inclusion of the vinyl benzene monomer in epoxypolybutadiene/anhydride formulations, in that these modified systems have a substantially lower viscosity than epoxypolybutadiene/anhydride formulations alone, and are therefore of greatly enhanced utility. A general characteristic of epoxidized polymers, even those of relatively low molecular weight and low epoxy content, is their high viscosity. Liquid polymers of butadiene become viscous oils or waxy solids on epoxidation, so that when it is desired to cure such resins by reacting with polyfunctional curing agents, it is difficult to obtain adequate mixing between the viscous or waxy epoxypolybutadiene and the curing agent, or to obtain adequate flow into molds or laminates. Reduction in viscosity of the epoxy polymer during formulation and use may of course be achieved by heating, but the accompanying reduction in the pot life of the composition is often disadvantageous; and although solvents may be used to dilute epoxy polymers, this technique is inapplicable for such end uses as encapsulating or molding.

Further, the curing compositions of this invention allow the use of high molecular weight or high epoxy content polymers as base resins, due to the lowering of their viscosity to a useful range by the presence of the vinyl benzene monomer. The advantages of high molecular weight polymers lie not only in that the range of polymers which may be used is substantially broadened, but also that higher flexural strengths and better chemical resistance may be obtained from high molecular weight base resins. Heretofore, many of the advantages inherent in the use of high molecular weight or high epoxy content polymers have been lost due to difficulties in handling viscous or solid epoxy polymers, or in finding curing formulations which would lower the viscosity without diminishing the favorable physical properties of the cured product.

The thermosetting epoxypolybutadiene compositions of this invention have a substantially lower viscosity in the uncured state, yet the physical properties of the cured polymer are preserved and actually enhanced. The utility of epoxypolybutadienes is thus substantially extended: for example, in laminates and potting compounds their excellent flow and wetting characteristics at room temperature provide both ease of handling and further stability to premature curing, whereas heretofore it was necessary to heat epoxypolybutadiene compositions to obtain adequate mixing and flow in these applications.

The base resin for the instant composition is a liquid polymer or copolymer of butadiene which has been epoxidized. The polybutadiene itself may be prepared by any of a number of well known methods, such as emulsion or solution polymerization using a wide variety of catalysts, including free radical, alkali metal, Friedel-Crafts and organo-metallic catalysts. Although heretofore satisfactory products generally required the use of liquid polymers having a molecular weight below about 2500, corresponding to a viscosity below about 50 poises at 25° C., higher polymers may be used effectively in the instant invention, having molecular weights up to about 10,000 and viscosities of 100 poises and higher. When epoxidized to a low epoxy content, even higher molecular weight polymers are conveniently used. The lower limit of the molecular weight range for these polymers is about 100: that is, mixtures of dimers and trimers could actually be employed, should they be desired to impart particular properties for special applications. In general, a convenient and preferred molecular weight range for the polybutadienes and copolymers is in the range of about 250 to 10,000. Useful techniques for the polymerization of butadiene to form liquid and solid polymers are described in U.S. Patents 2,631,175 and 2,791,618.

For the epoxidation of the polybutadienes and copolymers thereof, standard epoxidation techniques may be used. Aliphatic, aromatic, and inorganic peracids, salts of the peracids, peroxides and hydroperoxides are the most common of the effective epoxidizing agents. For convenience, lower aliphatic peracids, such as performic, peracetic, perpropionic and perbutyric are preferred reagents. With these reagents, the epoxidation reaction may be carried out using a preformed peracid, or the peracid may be formed in the reaction medium, generally by adding hydrogen peroxide to an aliphatic acid or anhydride medium. Peracids may be prepared in any known way, such as is described in "Organic Synthesis," Coll. Volume I, Second Edition, John Wiley and Sons (1941), page 431. A number of epoxidation techniques for polybutadiene are illustrated in an article by C. W. Wheelock in Industrial and Engineering Chemistry 50, 299–304 (1958).

The epoxidation may be conducted using stoichiometric amounts of the peracid; that is, one mole of hydrogen peroxide or peracid per double bond in the polymer; or amounts below that theoretically required may be used. There is no significant advantage to using excess oxidant and, although the reactivity and properties of the epoxidized polybutadienes do vary with the degree of epoxidation, it has been found that the use of as little as 5% of the theoretical amount of peracid will produce useful resins. In general, the epoxidized polybutadienes used herein contain at least 1% by weight of epoxy oxygen, and it is preferred for most applications to employ epoxypolybutadienes having about 4% to 10% epoxy oxygen by weight. Epoxypolybutadienes containing more than 10% epoxy oxygen may also be used, since their very high viscosity is reduced to a useful range by the vinylbenzene component of the curing system. A practical epoxidation limit for epoxypolybutadiene is about 15% by weight of epoxy oxygen. Should it be necessary or convenient to add a solvent to facilitate completion of the epoxidation reaction by reducing the viscosity of a particular resin during epoxidation, suitable solvents including such common organics as heptane, benzene and chloroform, the solvent may be removed before or after the addition of the vinylbenzene-type monomer.

As the anhydride component of the curing agent, a wide variety of unsaturated polycarboxylic anhydrides containing reactive double bonds are effective in this system, used alone or in combination with each other or with saturated anhydrides. Typical reactive unsaturated anhydrides include maleic anhydride, monosubstituted maleic anhydrides such as chloromaleic and citraconic; itaconic, bicyclo-(2,2,1)-5-heptene-2,3-dicarboxylic, bicyclo-(2,2,1)-5-methyl-5-heptene-2,3-dicarboxylic anhydride, and many other unsaturated anhydrides having reactive double bonds, of varied structure and properties.

Excellent results are readily and economically obtained with maleic anhydride, used either alone or in combination with other aliphatic, alicyclic and aromatic polycarboxylic anhydrides, to prepare compositions having specific curing characteristics and cured properties. For example, compositions may be prepared where as much as 95% of the anhydride component consists of a saturated anhydride, or an anhydride containing relatively unreactive double bonds, since the presence of even 5% of reactive double bonds in the anhydride contributes to the improved properties of the product. Typical anhydrides in combination include succinic, dodecenylsuccinic, octenylsuccinic, di- and tetrachlorophthalic, tetrahydrophthalic, hexahydrophthalic, dichloromaleic, pyromellitic, bicyclo-(2,2,1)-5-heptene-1,4,5,6,7,7-hexachloro-2,3-dicarboxylic anhydride, and many others.

Enough anhydride should be present to react with all of the epoxy groups on the epoxypolybutadiene resin, for optimum results, and thus the amount of anhydride used will depend on the particular base resin used. In general, excellent results are obtained from the use of 0.75 to 2 equivalents of anhydride per epoxide equivalent of epoxypolybutadiene, and useful products are produced in the range of 0.5 to 3 equivalents of anhydride per epoxide equivalent. When more than 3 equivalents are present the products tend to become brittle, and generally require modification in the base resin or in the curing formulation. All or part of the anhydrides used herein may be replaced with the corresponding acids. One epoxide equivalent of epoxypolybutadiene is defined as the amount of epoxypolybutadiene which contains one atom of oxirane oxygen; and a simple dicarboxylic anhydride or acid such as maleic contains two equivalents of anhydride or acid.

The second essential component of the curing system is a monomer of the formula

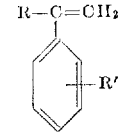

where R and R' may each be hydrogen or the methyl radical, typical examples of such monomers being styrene, alpha-methylstyrene and vinyltoluene. These vinyl monomers form stable solutions in epoxypolybutadiene, lowering the viscosity and facilitating mixing with the other components of the curing system. Without intending to be limited to any particular curing mechanism, it may be suggested that the vinylbenzene monomer copolymerizes with the unsaturated anhydride, and that this copolymerization is accompanied by interaction with the residual double bonds in the epoxypolybutadiene to form a terpolymer based on vinyl-type polymerization, which polymerization occurs concurrently with condensation interaction among the anhydride and epoxy and any hydroxyl groups which are also present. Thus the amount of vinylbenzene or homolog which is employed in the curing formulation depends somewhat on the degree of residual unsaturation in the particular polybutadiene base resin, and on the specific polymerization characteristics of the unsaturated anhydride used. In general, about 5 to 50 parts of vinyl monomer per 100 parts of epoxypolybutadiene may be used, with best results generally obtained in the range of 20 to 40 parts vinyl monomer per 100 parts epoxypolybutadiene. Minor amounts of other monomers may also be included in the formulation, and additional cross-linking may be provided through the use of difunctional vinyl monomers such as divinyl benzene.

Monomers of the styrene type as normally provided in commerce contain small amounts of an inhibitor, such as hydroquinone, to provide stability during shipping and storage. This is normally not enough to provide the beneficial results herein, although some benefit is observed when as little as 0.01 part hydroquinone, per 100 parts epoxypolybutadiene, are present. It is preferred that 0.03 to 0.2 part total hydroquinone per 100 parts epoxypolybutadiene be contained in the formulation of the curing composition, and up to 0.5 part hydroquinone is useful.

The free radical initiating agent may be any which is stable below the curing temperature, but which liberates free radicals into the system under the curing conditions. It is preferred herein to use organic compounds which are compatible with and soluble in the other components of the curing system, and which decompose in the range of 75° to 175° C. Examples of such compounds include t-butyl perbenzoate, benzoyl peroxide, dicumyl peroxide, 2,5-bis-(tert.-butylperoxy)-2,5-dimethylhexane, di-t-butyl diperphthalate, di-t-butyl peroxide, p-methane hydroperoxide, 2,2'-azo-bisisobutyronitrile, pinane hydroperoxide, 2,5-dimethylhexane-2,5-dihydroperoxide, cumene hydroperoxide, tert.-butyl hydroperoxide, and many others. If curing is to be effected in two or more stages by progressively increasing the temperature, a combination of two or more appropriately selected free radical initiators may be used.

The amount of free radical initiator used may vary over a wide range, and from 0.01 to 5% of peroxide, by weight of total reactive monomers (unsaturated anhydride and vinylbenzene), may be used. In general, excellent results are obtained in a preferred range of about 0.2 to 2% of peroxide. The decomposition of the peroxide may be promoted by the use of various well-known additives, of which typical examples are phosphoric acid, cobalt naphthenate, dimethyl aniline and boron trifluoride. The decomposition of the peroxide is, in fact, promoted during the curing reaction by acid formed during the reaction.

The components of the composition of this invention may be combined in any convenient way. Any two or more may be premixed prior to blending into the resin which itself may contain one or more of the cure agents. Alternately one or more of the cure agents may be blended with the resin prior to addition of the remaining prescribed cure agents.

It is preferred to combine the epoxypolybutadiene with the vinylbenzene monomer first, before addition of the other components of the curing system, due to the substantial reduction in viscosity imparted by the monomer. It is then possible to add even high melting anhydrides to the resin system and to obtain homogeneous solutions without significantly raising the mixing temperature or shortening the pot life. As an alternative procedure, the anhydride may be added first to the base resin, followed by addition of the other components. However, since anhydrides alone react rapidly with epoxypolybutadienes, additional precautions are necessary, such as careful temperature control.

Mixing of the components should of course be carried out at low to moderate temperatures, to facilitate control of the reaction rate, which increases with increased temperature. A useful procedure is to allow the composition to stand for a brief period at temperatures between about 0° C. and 75° C., and then to raise the temperature to about 75–175° C. to complete the reaction. Many variations in curing procedure are possible. The curing time varies with the starting materials and the curing temperature. In general, a reaction period of one half to four hours at 75–175° C. is sufficient, using peroxide catalysts that decompose in this temperature range.

The products of this invention are especially useful in such applications as the potting and encapsulating of electronic assemblies, and other casting and laminating applications benefitting from their enhanced flow and wetting properties and decreased viscosity. Their superior hardness and thermal stability provide enhanced utility in coatings and in many other applications. They may be combined with glass fibers or other reinforcing agents, with plasticizers, flexibilizers, fillers, extenders, pigments and dyes, and many other materials, for specific applications.

Illustrated below are the preparation and properties of different types of epoxypolybutadienes useful in the practice of this invention. All parts are by weight unless otherwise indicated.

EPOXYPOLYBUTADIENE "A"

Butadiene was polymerized as follows: A dispersion of sodium in refined kerosene was prepared by agitating 100 parts of sodium, 100 parts of refined kerosene and one part of dimer acid for one hour at 105–110° C. in a homogenizer to produce sodium particles of 2–10 microns in size. About 4 parts of sodium as a 46% dispersion in kerosene and 88 parts of benzene were charged to an agitated reactor, the temperature was raised to 92° C., and 5.0 parts of technical grade butadiene was added to initiate the reaction. The temperature was maintained at about 90° C. while 36.0 parts of butadiene was added continually. The reaction was continued until the monomer was completely reacted, as indicated by a drop in pressure. The reactants were then cooled to 50° C., and glacial acetic acid was added to destroy the catalyst. The mixture was filtered through soda ash, and the filtrate was stripped of volatiles over a temperature range of 19–55° C. at 23–57 mm. Hg. The residue was an oily polybutadiene, having an iodine number of 320 and a melt viscosity of 42 poises at 25° C. and zero shear.

This polybutadiene was epoxidized as follows: About 100 parts of polybutadiene, 100 parts of toluene, 40 parts of Dowex resin 50 X–8 (a sulfonated styrene-divinylbenzene copolymer cross-linked with 8% divinylbenzene) and 22 parts of glacial acetic acid were charged to an agitated flask. About 48 parts of 50% hydrogen peroxide was added to the mixture. The ingredients were allowed to react at 65° C. until essentially all of the peroxide was depleted. The batch was filtered through a cloth to remove the ion exchange resin, and a slurry of 20 parts of sodium carbonate in 100 parts of toluene and 75 parts of sodium sulfate were added to the filtrate. After allowing the inorganic cake to settle, the oil layer was separated by filtration. About 25 parts of magnesium sulfate was added to the filtrate to clarify the polymer solution which was then filtered, and stripped of volatiles for eight hours at 80° C. and 29 mm. Hg. The epoxypolybutadiene obtained as residue had an epoxy oxygen content of 6.7% by weight, iodine number of 230 and viscosity of about 16,000 poises at 25° C. extrapolated to zero shear.

EPOXYPOLYBUTADIENE "B"

Butadiene was polymerized as follows: About 4.3 parts of sodium as a 46% dispersion in benzene and 162 parts of benzene were charged to an agitated reactor, the temperature was raised to 90° C., and 3.0 parts of technical grade butadiene was added. The temperature was maintained at about 85° C. while 97 parts of butadiene and 20 parts of dioxane were added over a period of 3.5 hours. The reaction ingredients were then cooled to 50° C. and added to 19 parts of glacial acetic acid. The mixture was filtered through 21 parts of soda ash, and the filtrate was stripped of volatiles over a temperature range of 19–55° C. at 23–57 mm. Hg. The residue was a liquid polybutadiene, having an iodine number of 399, melt viscosity of 7.0 posies at 25° C., and molecular weight of 850.

This polybutadiene was epoxidized as follows: About 100 parts of liquid polybutadiene, 100 parts of benzene, 21 parts of Dowex resin 50 X–12 (a sulfonated styrene-divinylbenzene copolymer cross-linked with 12% divinylzenzene) and 16.2 parts of glacial acetic acid were heated with agitation to 60° C. About 70 parts of 50% hydrogen peroxide was then added, over a period of 2 hours. The temperature was maintained at 65° C. for an additional 2 hours, the mixture was cooled to 30° C., mixed with 100 parts of benzene, and filtered. The oily layer was separated by centrifuging, washed with an equal volume of water, made neutral with sodium hydroxide solution, separated, washed again with water, separated, and stripped of benzene at 85° C. and 12 mm. Hg. The epoxypolybutadiene obtained as residue exhibited an iodine number of 186, an epoxy oxygen content of 9.1% by weight and a melt viscosity of 1760 poises at 25° C.

The following examples illustrate the curing of the typical epoxypolybutadienes described above. Mechanical and electrical properties of the specific products described in the examples were determined according to standard ASTM tests, as described in "ASTM Standards on Plastics (1958)." Heat distortion temperatures were determined according to ASTM method D648–56, Rockwell hardness according to ASTM method D785–51, flexural properties according to ASTM method D790–58T, tensile properties according to ASTM method D638–58T, and conditioning of specimens according to ASTM method D618–58. All parts are by weight.

*Example 1*

To 30 parts of epoxypolybutadiene "A" were added 9.0 parts of styrene, 9.3 parts of maleic anhydride, 9.3 parts of hexahydrophthalic anhydride, 0.3 part of dicumyl peroxide and 0.3 part of 2,5-bis-(tert.-butylperoxy)-2,5-dimethylhexane. The mixture was spread on 12 plies of 0.0085 inch thick long-shaft satin weave glass cloth having a vinyl silane finish. The laminate was precured three minutes at 70° C., nine minutes at 135° C. at 20 p.s.i., and 5 hours at 155° C. The cured laminate had a flexural strength of 73,600 p.s.i.

Example 2

To 30 parts of epoxypolybutadiene "A" were added 0.06 part of hydroquinone in 0.2 part acetone, 9.0 parts of styrene, 9.15 parts maleic anhydride at 60° C. and 0.18 part of dicumyl peroxide. The mixture was spread onto 12 plies of glass cloth. The laminate was precured three minutes at 70° C., nine minutes at 135° C. and 25 p.s.i., and five hours at 155° C. The flexural strength of the cured laminate was 59,000 p.s.i. and the flexural modulus was 3,270,000 p.s.i.

Example 3

To eight parts of epoxypolybutadiene "B" were added three parts of styrene, two parts of maleic anhydride at 60° C. and 0.005 part 2,5-bis-(tert.-butylperoxy)-2,5-dimethylhexane. The mixture was poured into an aluminum pan, and cured for five hours at 100° C. The casting was dark amber, and had a Rockwell hardness of 112 on the R scale.

Repeating the above experiment, omitting the peroxide, produced a casting having a Rockwell hardness of 14 (R scale).

Example 4

To 30 parts of epoxypolybutadiene "B" were added 0.06 part of hydroquinone in 0.33 part acetone, 9.0 parts styrene, 9.15 parts maleic anhydride at 60° C. and 0.06 part dicumyl peroxide. The mixture was poured into a mold and cured four hours at 80° C., two hours at 90° C., and two hours at 155° C. The product was a clear amber casting which exhibited heat distortion temperatures of 145°, 186° and 198° C., at deflections of 10, 20 and 40 mils.

Example 5

To 10 parts of epoxypolybutadiene "B" were added 0.003 part hydroquinone, 0.05 part benzoyl peroxide, 30 parts styrene and 3.9 parts molten maleic anhydride. After three hours at 60° C., and 2 hours at 155° C., the casting was clear, dark and rigid.

Repeating this procedure, omitting the hydroquinone and benzoyl peroxide, produced an opaque, dark and rigid product.

It is apparent that this invention is susceptible to numerous modifications within the scope of the disclosure, and it is intended to include such variations within the scope of the following claims.

We claim:

1. A curable resin composition comprising an epoxidized polybutadiene containing polymerizable double bonds and 1–15% by weight of epoxy oxygen; about 0.5 to 3 equivalents per epoxy oxygen of a dicarboxylic anhydride, of which at least 5% by weight is a dicarboxylic anhydride containing a polymerizable olefinic double bond; 5 to 50 parts, per 100 parts of epoxidized polybutadiene, of a monomer of the formula

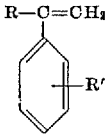

wherein R and R' are each selected from the group consisting of hydrogen and the methyl radical; and 0.01–5%, by weight of unsaturated anhydride and monomer, of a free radical polymerization initiator having a decomposition point in the range of 75° to 175° C.

2. The composition of claim 1, wherein said unsaturated anhydride is maleic anhydride.

3. The composition of claim 1, wherein said free radical initiator is an organic peroxide.

4. The composition of claim 1, wherein said monomer is styrene.

5. The composition of claim 1, wherein said monomer is alpha-methyl styrene.

6. The composition of claim 1, wherein said monomer is vinyl toluene.

7. A curable resin composition comprising an epoxidized polybutadiene containing polymerizable double bonds and 4% to 10% by weight of epoxy oxygen; about 0.5 to 3 equivalents per epoxy oxygen of a dicarboxylic anhydride containing a polymerizable olefinic double bond; 5 to 50 parts of styrene per 100 parts of epoxidized polybutadiene; 0.01 to 0.5 part of hydroquinone per 100 parts epoxidized polybutadiene; and 0.2–2%, by weight of unsaturated anhydride and styrene, of an organic peroxide having a decomposition point in the range of 75° to 175° C.

8. A curable resin composition comprising an epoxidized polybutadiene containing polymerizable double bands and 4% to 10% by weight of epoxy oxygen; about 0.75 to 2 equivalents per epoxy oxygen of a dicarboxylic anhydride containing a polymerizable olefinic double bond; 20 to 40 parts, per 100 parts of epoxidized polybutadiene, of styrene; 0.03 to 0.2 part of hydroquinone per 100 parts epoxypolybutadiene; and 0.2–2%, by weight by unsaturated anhydride and styrene, of an organic peroxide having a decomposition point in the range of 75° to 175° C.

9. The method of curing an epoxypolybutadiene resin containing polymerizable double bonds and 1–15% by weight of epoxy oxygen, which comprises reacting said epoxypolybutadiene with about 0.5 to 3 equivalents per epoxy oxygen of a dicarboxylic anhydride, of which at least 5% is a dicarboxylic anhydride containing a polymerizable olefinic double bond; 5 to 50 parts, per 100 parts of epoxidized polybutadiene, of a monomer of the formula

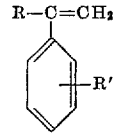

wherein R and R' are each selected from the group consisting of hydrogen and the methyl radical; and 0.01–5%, by weight of unsaturated anhydride and monomer, of a free radical polymerization initiator having a decomposition point in the range of 75° to 175° C.

10. The method of curing an epoxypolybutadiene resin containing polymerizable double bonds and 4% to 10% by weight of epoxy oxygen, which comprises reacting said epoxypolybutadiene at a temperature of 75° to 175° C. with about 0.75 to 2 equivalents per epoxy oxygen of a dicarboxylic anhydride containing a polymerizable double bond; 20 to 40 parts, per 100 parts of epoxidized polybutadiene, of styrene; and 0.2–2%, by weight of unsaturated anhydride and styrene, of an organic peroxide which decomposes in the range of 75° to 175° C.

11. A thermoset resin composition comprising the reaction product of an epoxidized polybutadiene containing polymerizable double bonds and 1–15% by weight of epoxy oxygen; about 0.5 to 3 equivalents per epoxy oxygen of a dicarboxylic anhydride containing a polymerizable double bond; 5 to 50 parts of styrene, per 100 parts of epoxidized polybutadiene; and 0.2–2% by weight of unsaturated anhydride and styrene, of a free radical polymerization initiator having a decomposition point in the range of 75° to 175° C.

References Cited in the file of this patent

UNITED STATES PATENTS

| | | |
|---|---|---|
| 2,781,333 | Updegraff | Feb. 12, 1957 |
| 2,829,135 | Greenspan et al. | Apr. 1, 1958 |

UNITED STATES PATENT OFFICE
CERTIFICATE OF CORRECTION

Patent No. 3,092,608

June 4, 1963

Murray H. Reich et al.

It is hereby certified that error appears in the above numbered patent requiring correction and that the said Letters Patent should read as corrected below.

Column 1, line 59, for "boling" read -- boiling --; column 4, line 62, for "p-methane" read -- p-menthane --; column 6, lines 38 and 39, for "divinylzenzene" read -- divinylbenzene --; column 8, line 18, for "bands" read -- bonds --; line 24, for "by" read -- of --.

Signed and sealed this 10th day of December 1963.

(SEAL)
Attest:

ERNEST W. SWIDER

Attesting Officer

EDWIN L. REYNOLDS

Acting Commissioner of Patents